United States Patent [19]

Johnson et al.

[11] Patent Number: 5,201,692

[45] Date of Patent: Apr. 13, 1993

[54] RIDER TRANSAXLE HAVING HYDROSTATIC TRANSMISSION

[75] Inventors: Alan W. Johnson, Ames, Iowa; Ray M. Hauser, Decatur, Ill.

[73] Assignee: Hydro-Gear Limited Partnership, Sullivan, Ill.

[21] Appl. No.: 727,463

[22] Filed: Jul. 9, 1991

[51] Int. Cl.$^5$ .......................................... F16H 39/16
[52] U.S. Cl. ........................................ 475/74; 475/83
[58] Field of Search .......................... 475/72, 74, 83

[56] References Cited

U.S. PATENT DOCUMENTS

| | | | |
|---|---|---|---|
| 3,279,172 | 10/1966 | Kudo et al. | 60/53 |
| 3,424,032 | 1/1969 | Ritter | 74/730 |
| 3,751,924 | 8/1973 | Brown et al. | 60/485 |
| 4,145,883 | 3/1979 | Forster | 60/458 |
| 4,856,264 | 8/1989 | Nishimura et al. | 56/10.9 |
| 4,856,368 | 8/1989 | Fujisaki et al. | 475/74 X |
| 4,862,767 | 9/1989 | Hauser | 74/687 |
| 4,870,820 | 10/1989 | Nemoto | 60/487 |
| 4,891,943 | 1/1990 | Okada | 60/464 |
| 4,893,524 | 1/1990 | Ohashi et al. | 74/687 |
| 4,899,541 | 2/1990 | Okada et al. | 60/464 |
| 4,903,545 | 2/1990 | Louis et al. | 74/606 R |
| 4,914,907 | 4/1990 | Okada | 60/487 |
| 4,922,787 | 5/1990 | Fujisaki et al. | 475/83 |
| 4,932,209 | 6/1990 | Okada | 60/487 |
| 4,942,780 | 7/1990 | Fujisaki et al. | 475/83 |
| 4,953,426 | 9/1990 | Johnson | 74/606 R |
| 4,979,583 | 12/1990 | Thoma et al. | 180/62 |

OTHER PUBLICATIONS

"Kanzaki Transaxle" advertisement.
Eaton "Hydrostatic Transaxle Series 1150" Sep. 1984.
"TRW Ross Gear Torqdrive Axle".

*Primary Examiner*—Dirk Wright
*Attorney, Agent, or Firm*—Robert E. Browne; Thomas C. McDonough

[57] ABSTRACT

A transaxle with a hydrostatic transmission which is compact, reliable and economical to manufacture, including a novel means for hydraulically reducing the speed of the input to the transaxle; an improved differential which is stronger and less complicated than prior art designs; a longer lasting, more effective means of preventing oil leakage from the axle shafts in the transaxle housing; a center section for the hydrostatic transmission supporting the output drive shaft, eliminating the need for additional bearing support; an improved means for hydraulically bypassing the hydrostatic transmission and a unique check valve arrangement for maintaining oil pressure within the hydrostatic transmission. The hydrostatic transmission also includes a pump and a motor whose orientation to one another may be varied according to the space requirements dictated by the size and configuration of the vehicle through the use of a helical gear.

26 Claims, 9 Drawing Sheets

RIDER TRANSAXLE HAVING HYDROSTATIC TRANSMISSION

BACKGROUND OF THE INVENTION

This invention relates generally to transaxles including a hydrostatic transmission ("HST") commonly used with riding lawn mowers and similar small tractors. Such tractors generally use an engine having a vertical output shaft which is connected to the transaxle via a conventional belt and pulley system. A standard HST for such a transaxle includes a hydraulic pump, which is driven by the engine output shaft, and a hydraulic motor, both of which are usually mounted on a center section. Rotation of the pump by an input shaft creates an axial motion of the pump pistons. The oil pressure created by this axial motion is channelled via porting to the hydraulic motor, where it is received by the motor pistons, and the axial motion of these pistons against a thrust bearing causes the motor to rotate. The hydraulic motor in turn has an output shaft which drives the vehicle axles through differential gearing.

Among the advantages of transaxles with hydrostatic transmissions are the reduction of the number of parts and in the size of the unit, and, in some instances, the elimination of mechanical gears. As is known in the art, the use of a transaxle having a hydrostatic transmission enables the manufacturer to include all necessary elements in one unit, whereby the transaxle is easily incorporated into the tractor design, as it requires only the addition of a belt to connect it to the motor and a control lever for changing speed and direction. While the basic principles of transaxles with an HST are well known in the prior art, there are several disadvantages of present transaxles with HST designs. These disadvantages, and the present invention's means for overcoming them, are set forth herein.

A major problem with some prior transaxle designs is that the transmission is too large and too expensive to be used with the smaller tractors where it would be most effective. An attempt to solve this problem is shown in Okada, U.S. Pat. Nos. 4,914,907 and 4,932,209. The Okada '209 patent discloses a first mechanical deceleration means, namely the gear on the motor shaft and counter-shaft within the axle housing, and a second mechanical deceleration means in the differential. The gearing in the deceleration means eventually transmits power to the differential gears, which are then used to drive the output axle. However, these mechanical deceleration units add unnecessary weight and expense to the unit. An object of the present invention is to provide an transaxle design which does not require such additional mechanical deceleration means.

Another variation on the standard transaxle with HST design is shown in Thoma, U.S. Pat. No. 4,979,583. This patent teaches the segregation of the hydraulic units from the remaining portions of the transaxle through the use of separate segregated cavities to house each. In addition, the pump and motor in the Thoma design are mounted back-to-back, so that the input and output shafts have the same orientation. Thus additional gear units are required to re-orient the rotation of the output shaft so that it is parallel to the ultimate drive axle. Further gears then drive a differential which rotates the drive axle. This additional gearing adds weight to the unit and expense to the manufacturing process.

Thus, the Okada and Thoma designs present problems from the standpoint of manufacturing a small, economical transaxle including an HST which is easily adaptable to different size tractors or axle configuration. Okada requires multiple gearing and Thoma requires a housing having segregated cavities. The present invention is designed to overcome these and other problems in the prior art by providing a compact, economical transaxle with HST which substantially reduces the number of moving parts previously required.

SUMMARY OF THE INVENTION

The present invention, sometimes referred to generally as a "transaxle," includes a split-axle housing which encases an HST. The HST includes a pump and a motor whose orientation to one another may be varied according to the space requirements dictated by the size and configuration of the vehicle. This transaxle also includes a novel hydraulic reduction means, an improved differential, a longer lasting, more effective means of preventing oil leakage from the axle shafts in the housing, a center section supporting the output drive shaft, an improved means for hydraulically bypassing the HST and a unique check valve arrangement. Each of the specific novel improvements are combined to provide a transaxle which is compact, reliable and economical to manufacture. These and other objects and improvements of this invention will be set forth in more detail herein.

One object of this invention is to provide an improved transaxle wherein the center section of the HST, on which the pump and motor are mounted, also serves as the bearing support of the output drive shaft. In the prior art, for example, Okada U.S. Pat. No. 4,932,209, one end of the gear drive arrangement is supported in the center section, but the other end is supported by the upper and lower axle housing casings.

The advantage of the present invention's arrangement is that it eliminates the need for an additional bearing support, thus reducing the costs and assembly time required. It also eliminates the tolerance concerns for aligning the bearing supports for the output drive shaft.

A further object of this invention is to provide a transaxle that requires only a single mechanical reduction unit, because a portion of the overall reduction is provided hydrostatically. The prior art generally requires dual or multiple mechanical reduction units in conjunction with the hydraulic unit. For example, as set forth above, U.S. Pat. No. 4,932,209 requires the use of two separate mechanical reduction units, including a separate counter-shaft between the hydraulic motor and the differential used to drive the output axle.

The present invention makes this same reduction through the hydraulics itself by the use of a motor which is larger in displacement than the pump. This eliminates the need for any secondary mechanical reduction units, thereby reducing sources of possible mechanical failure. The single reduction arrangement reduces the number of necessary components and the size of the transmission, and it eliminates the need for an additional support shaft or jack shafts, thus resulting in a smaller, simpler and less expensive transaxle. In a heavy duty application, the prior art often used two sets of mechanical reduction units to handle the necessary reduction. In such instances, the present invention's hydraulic reduction can eliminate the need for such multiple reduction units or could be used in conjunction with secondary units only.

A further object of this invention is to restrict the oil from having to extend to the outer axle support bearings, as is common in prior art models. The gearing and the hydrostatic transmission element of this invention are enclosed in a single chamber formed by an upper casing and a lower casing. The axle shafts extend through this chamber and are supported by separate bearing surfaces outside of the chamber.

In most of the prior art, the entire axle casing is filled with oil out to the outer axle bearings to provide lubrication to these bearings, in addition to the hydrostatic function of the oil in the pump and motor. However, after the outer axle bearings wear through use, the eccentricity or "play" in the shaft may distort the oil seal at said outer bearings, allowing the leakage of oil out of the main chamber. Maintenance of a leak. free joint is critical to the function and appearance of such a transaxle with HST unit. The entire internal hydraulic parts of an HST should be covered with oil, as an insufficient amount of oil in the main transmission cavity will cause foaming of the oil, damaging the hydraulic structures. Excessive oil leakage is a serious problem as it will hamper the ability of the HST to operate and can cause damage to the internal workings of the HST. Oil leakage also presents an aesthetic problem for manufacturers of transaxles, as customers are usually quite disturbed by the presence of oil leaks and the accompanying oil stains. Thus, the reduction or elimination of oil leakage is critical for the continued success of transaxle sales.

In the prior art, maintenance of such a leak-free joint at the outer bearings requires the use of extra bolts and sealant, which add additional weight and cost to the unit. An additional problem with prior art designs is that such wear in the outer axle bearings can also cause contamination of the oil due to the presence of "shavings" and other detritus from the worn bearings.

Although such construction could be used with the other novel elements of the present invention, to solve these problems of leakage and potential oil contamination at minimum cost, the present invention also presents a unique means of restricting the oil to those portions of the transaxle where it is needed to lubricate the differential and to work the pump and motor of the HST. Thus, chambers separate from the main chamber enclosing the HST and differential surround the majority of each axle shaft. Therefore, the oil does not extend throughout the entire casing or to the outer axle bearings, removing the potential problem of oil leaking from the casing. Separate grease pockets are used to lubricate these outer axle bearings, resulting in a much more durable seal and allowing for the use of a higher viscosity grease to lubricate these outer axle bearings.

This improvement also allows for a reduction in the amount of oil needed to fill the transmission case, and, due to the reduced sealant area at the outer axle bearings, a reduction in the amount of sealant required. Due to the fact that the maintenance of a leak-free joint at the outer axle bearings is not required, this invention also allows for reduced manufacturing tolerances, which reduces the manufacturing costs of the unit.

A further improvement is in the method used to place the transaxle into neutral gear to enable movement of the tractor without the motor running. A problem with the typical HST arrangement is that "neutral gear" does not exist, as it is merely a point where the hydraulic pressure in the pump goes to zero. However, at this point the oil remains in the transmission, preventing the vehicle from being rolled freely.

The prior art generally solves this problem by diverting the oil through a hydraulic valve from the pressure side to the vacuum side of the HST center section. The problem with such a design is that the hydraulic valve allows for the movement of only a limited amount of oil due to inherent design limitations, such as the diameter of the hydraulic value through which the oil is diverted. Furthermore, machining such a valve requires precise tolerances, thus increasing the manufacturing costs of the unit.

In the present invention, this problem is solved by providing a mechanism whereby the motor block is mechanically lifted from its running surface, thereby allowing the oil to bypass the vacuum-pressure circuit and to exit the case completely. This operates to enable the vehicle to freewheel more easily than is possible with the prior art hydraulic valve method.

Another object of the present invention is to provide an improved design of the motor and motor thrust bearing in a hydrostatic transmission, whereby the motor shaft does not extend through the motor thrust bearing, and thus the bearing is fully supported and does not require an intermediate support plate, as is used on prior art models.

For example, U.S. Pat. No. 4,953,426 to Johnson teaches a thrust bearing having a motor shaft extending through its center section. As in the present invention, the thrust bearing in Patent '426 is supported by one section of the housing. However, because the '426 thrust bearing has the motor shaft extending through its center, it is not solely supported by the housing, but rather is supported by two "fingers" on either side of the thrust bearing. To support the thrust bearing against the hydraulic forces applied by the motor pistons, an additional structurally significant piece is required to support between these fingers.

In the present invention, the thrust bearing is fully supported by the housing part into which it is inserted, thus eliminating the need for an additional structural member. This results in an assembly that is simpler and less expensive to manufacture.

A further object of this invention is an improved differential gear assembly. In the prior art, differential assemblies generally require a cross-shaft to support the planet bevel gears. The arrangement of the present invention eliminates the need to use such a cross-shaft by providing a simple end cap axle support and bevel gear entrapment.

An additional novel feature of this invention is the design of the check valve for the center section. Prior art check valve designs generally use hardened steel balls working against a steel or cast iron seat. To minimize the overall weight of the transaxle unit, however, the center section of the present invention is preferably made of cast aluminum, which is not strong enough to function as such a valve seat and to withstand the wear from such a check valve operation. This problem is solved by the use of a steel insert in the center section to support the steel balls.

To create a seal at such a location, it is known to use a machined surface on both the seat and the insert, so that a standard O-ring seal could be used. However, use of such a sealing means would require additional machining steps on the seat and insert, adding to the overall manufacturing costs of the unit.

To overcome these problems in the prior art, the present invention calls for the use of a powdered metal plate which acts as both the check valve seat and as the seal. The sealing functions of the plate are created through the use of a raised surface on the plate, which is pressed into the lower strength aluminum to form a seal. This design has the advantage of being simple and inexpensive to manufacture, while maintaining the advantages of a light overall weight.

It is a further object of this invention to provide an improved hydrostatic transmission wherein the pump and the motor of the HST need not be orientated at a 90-degree angle to one another as required by the prior art. In the present invention, the 90-degree orientation is the preferred embodiment. However, an orientation other than 90-degrees can be achieved by use of a helical gear between the output drive shaft and the differential.

Further explanation and details of the above objects of this invention, as well as other benefits and advantages of this invention, will be set forth in the following sections.

DETAILED DESCRIPTION OF THE DRAWINGS

All hydrostatic transmissions operate on the principle of an input shaft driving a pump, which, through the action of its pistons, pushes oil to a motor, which rotates a motor shaft. This rotation is eventually transferred through a differential gearing system to drive an axle shaft. With these general principles in mind, we turn to the drawings of the present invention showing the various improvements made by this invention on the prior art.

Figure 1:
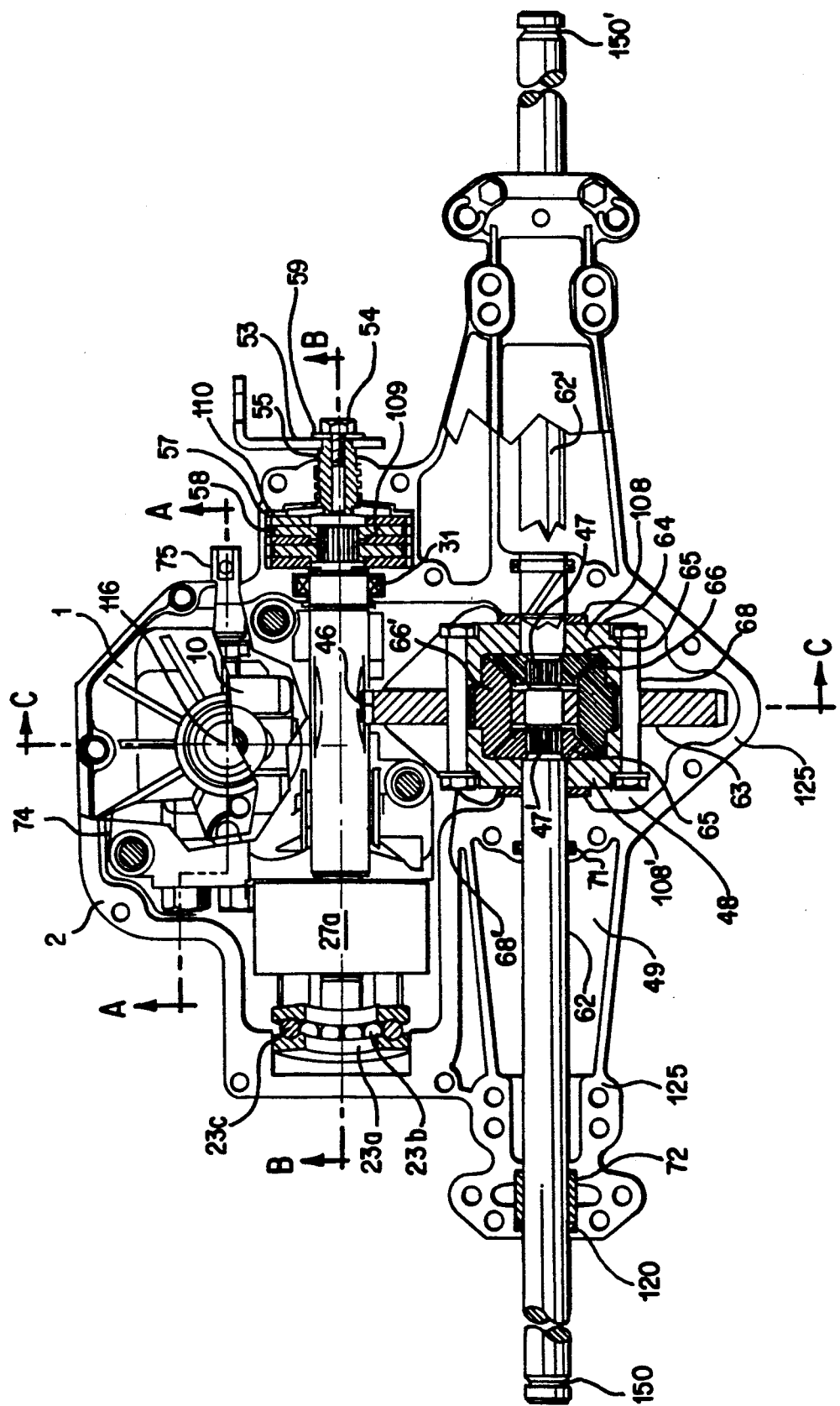
FIG. 1 is a top view of a transaxle with a hydrostatic transmission manufactured in accordance with this invention.
Figure 2:
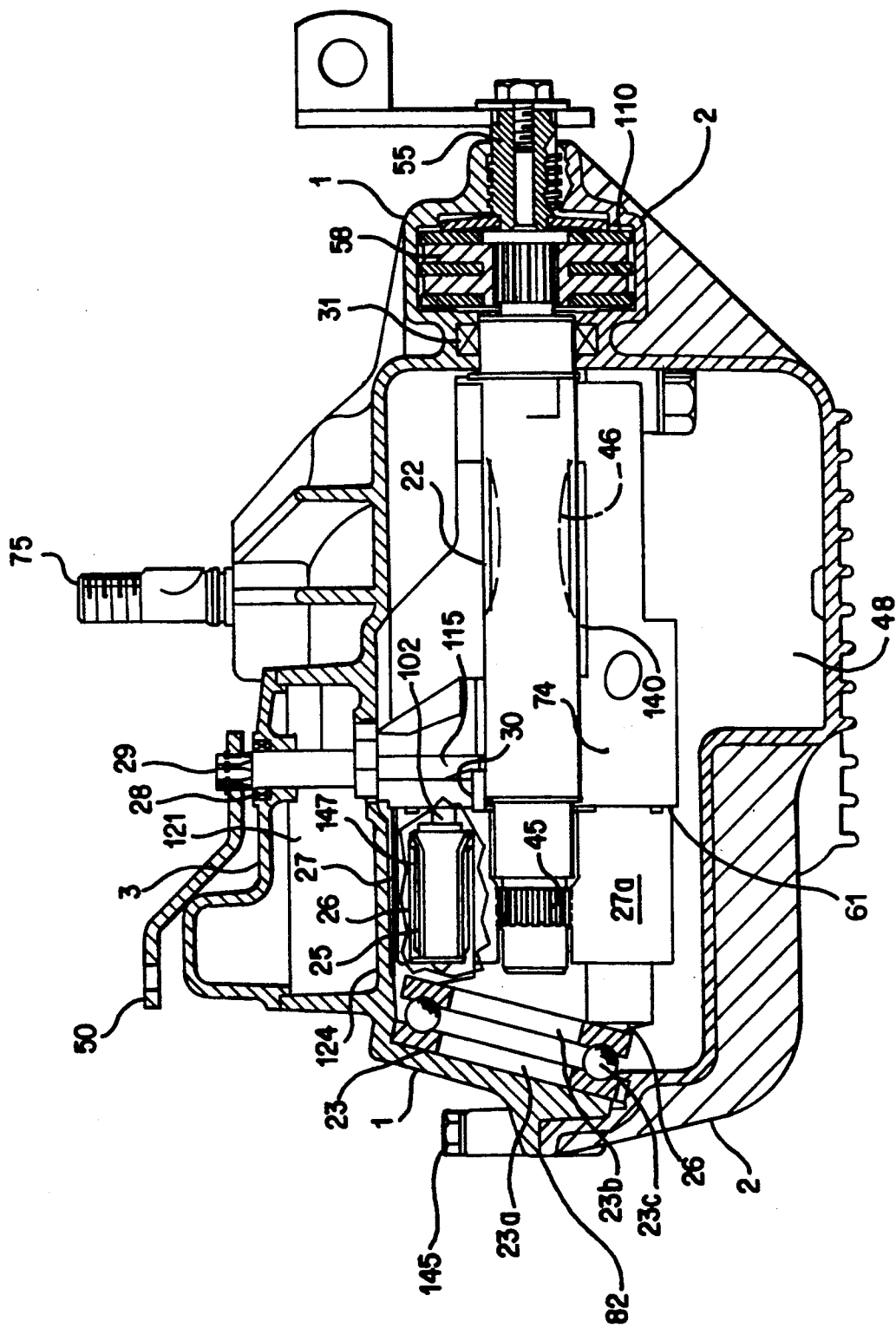
FIG. 2 is a fragmentary elevational section view along the line B—B of FIG. 1.
Figure 3:
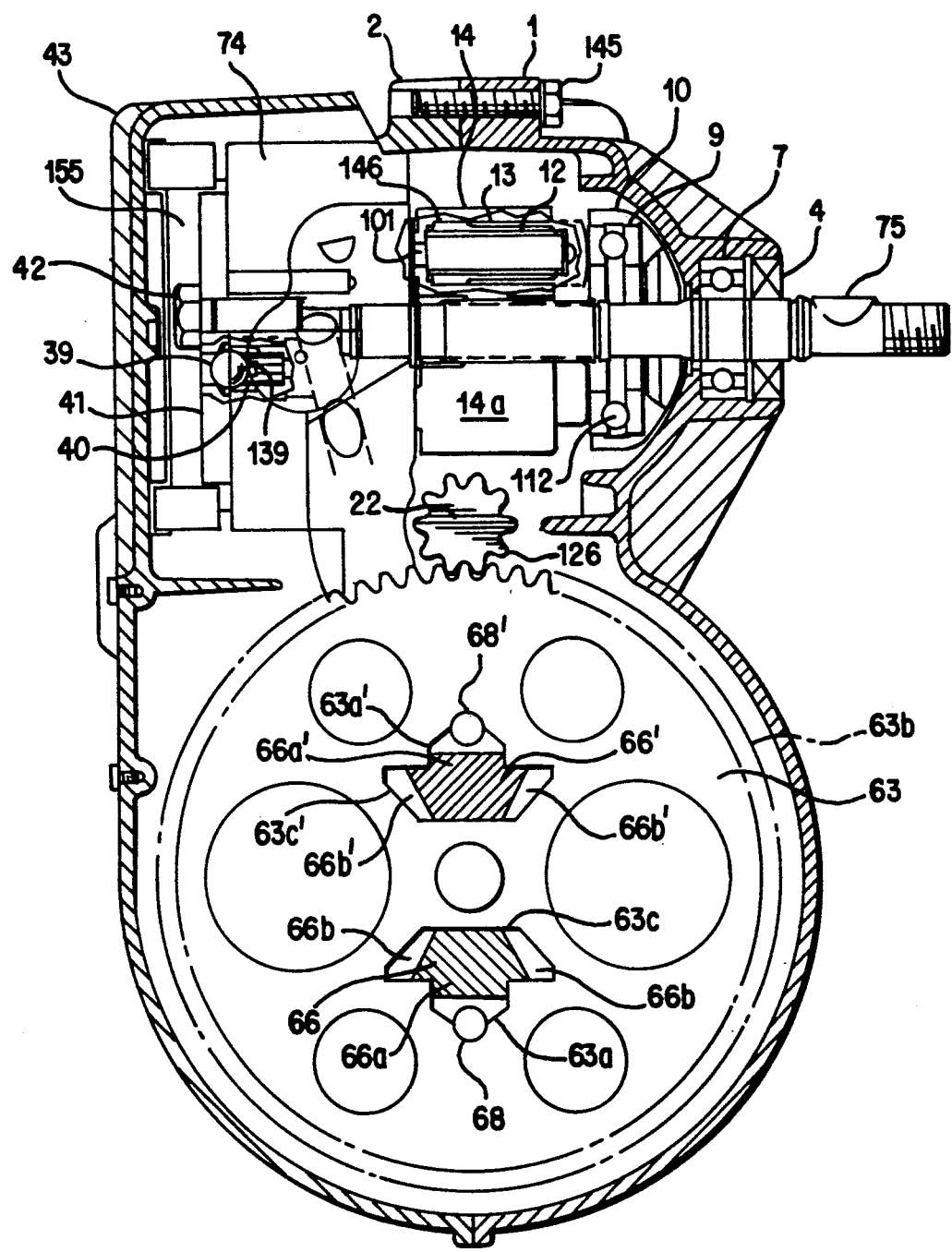
FIG. 3 is a fragmentary side view along the line C—C of FIG. 1.

FIG. 1 shows an overview of the entire transaxle of the present invention including an HST system. Referring also to FIGS. 2 and 3, the transaxle is encased in an upper housing 1 and a lower housing 2 which are secured by a plurality of bolts 145 and a liquid gasket seal 82 at the joining surface of housings 1 and 2. Input shaft 75 extends through shaft opening 116 and is supported by bearing 7 and ring 5, which are retained by seal 4. Input shaft 75 is driven by a belt (not shown) which is powered by a vertical shaft engine (not shown). As shown most clearly in FIG. 3, the rotation of input shaft 75 rotates the cylinder block 14a of pump 14 at the speed of input shaft 75. Pump 14 is of conventional construction, containing a series of piston receiving chambers 146, each of which movably mounts a pump piston 13 and piston spring 12 in a direction axial to cylinder block 14a of pump 14.

Figure 4:
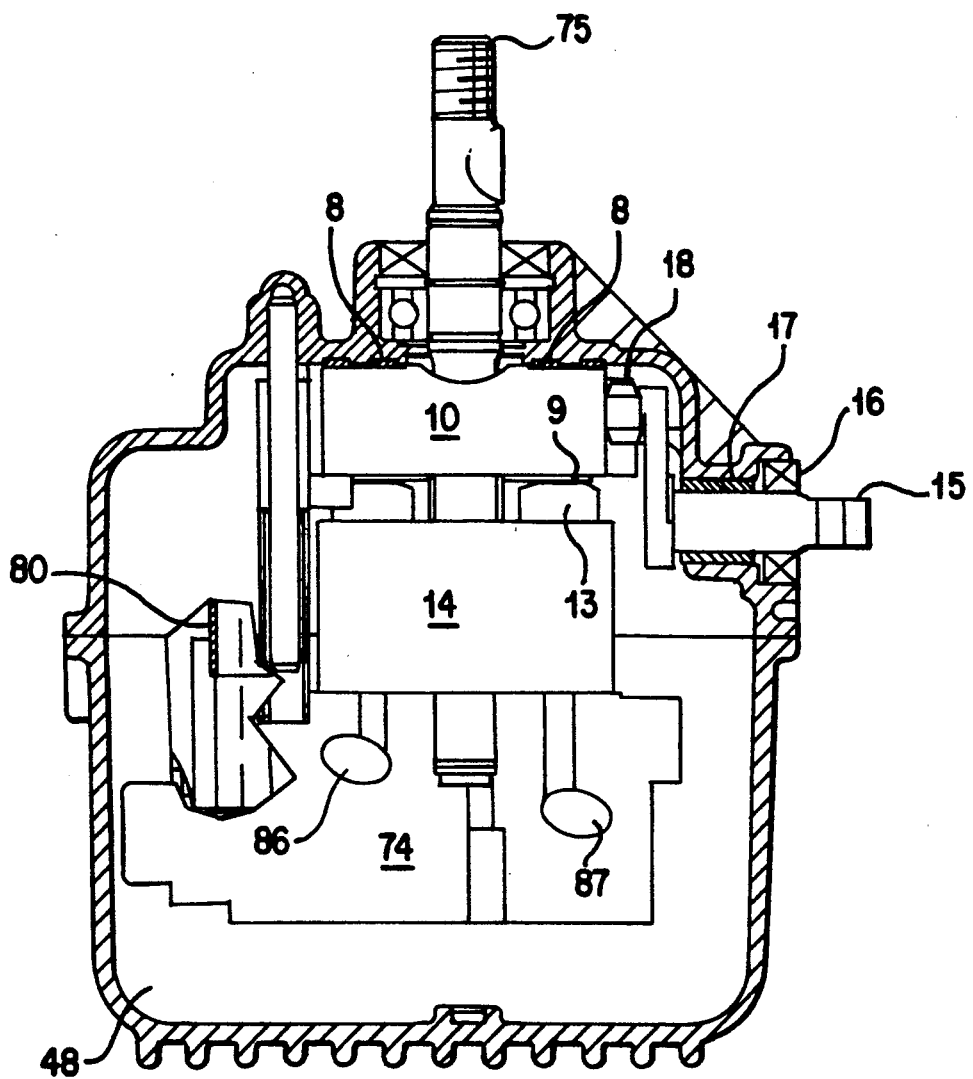
FIG. 4 is a fragmentary elevational section view along the line A—A of FIG. 1.

Pump pistons 13 are powered by piston springs 12 against thrust bearing 9, which, as is well known in the art, is rotatably supported in swashplate 10 by a standard bearing and bearing guide structure, including bearing 112. Swashplate 10 is itself supported in upper housing 1 by bearing cradle 8, as shown in FIG. 4.

Thrust bearing 9 acts as a ramp against which pump pistons 13 are pressed. The rotation of pump 14 causes pump pistons 13 to travel up or down this ramp, thus creating an axial motion for pump pistons 13. Swashplate 10 may be moved to a variety of positions on bearing cradle 8 to vary the stroke of pump pistons 13. This varies the volume of oil pumped, which ultimately varies the speed of motor 27, as described herein.

Movement of swashplate 10 is accomplished by the user's manipulation of trunion shaft 15, which in turn moves bearing guide 18. As is known in the art, trunion shaft 15 is supported by journal bearing 17, which is retained by seal 16. For example, if thrust bearing 9 is perpendicular to input shaft 75 and thus perpendicular to the axial plane of pump pistons 13, there will be no point along thrust bearing 9 where pump pistons 13 are forced axially, thus resulting in no axial motion for pump pistons 13 and no oil flow between pump 14 and motor 27. This position is effectively a "neutral" position for the HST, in that rotation of input shaft 75 will not ultimately result in movement of the vehicle.

The operator may move swashplate 10 by adjusting trunion shaft 15, which varies bearing guide 18, in one direction to create a "forward" ramp at thrust bearing 9, so that axial motion of pump pistons 13 forces the oil flow in one direction. The operator may also reverse the oil flow by moving thrust bearing 9 to the opposite, or reverse, position. The details of the resulting oil flow through the porting system of the HST are set forth herein.

Figure 5:
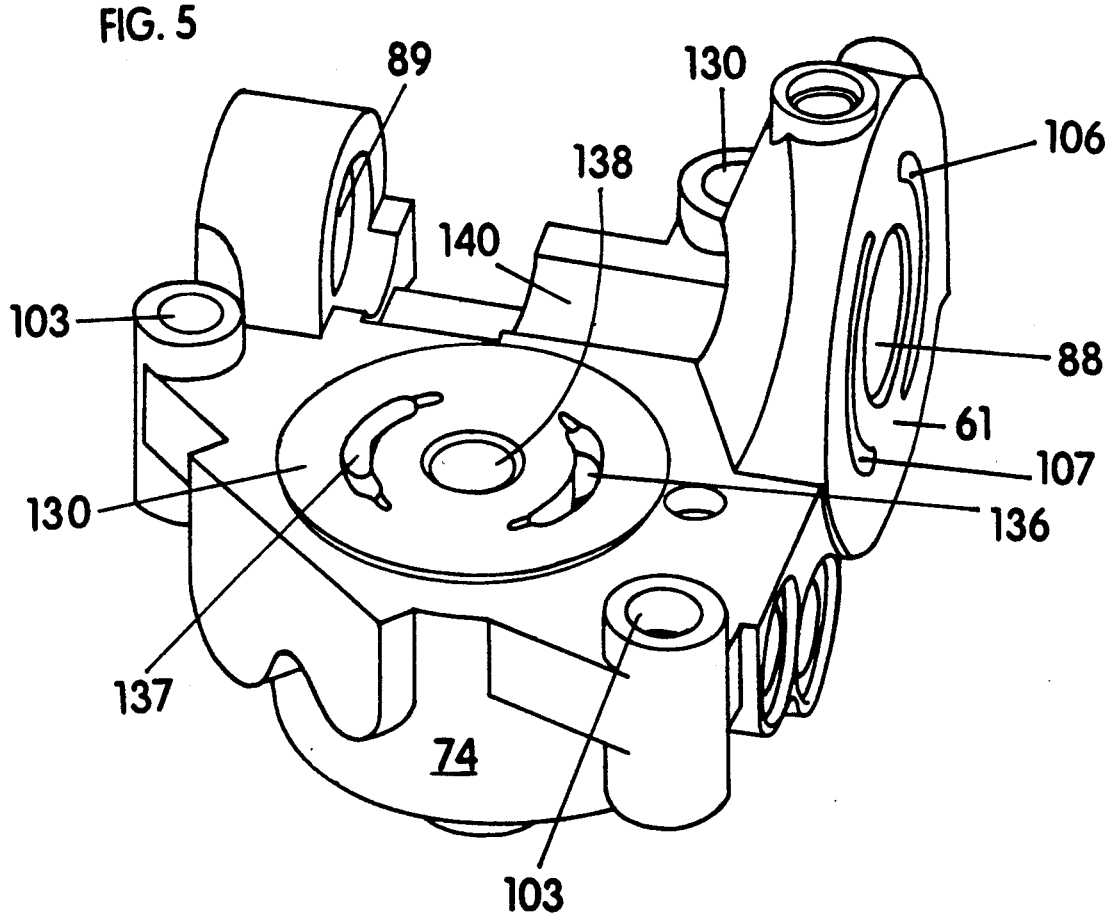
FIG. 5 is a perspective view of a center section of a hydrostatic transmission in accordance with this invention.
Figure 6:
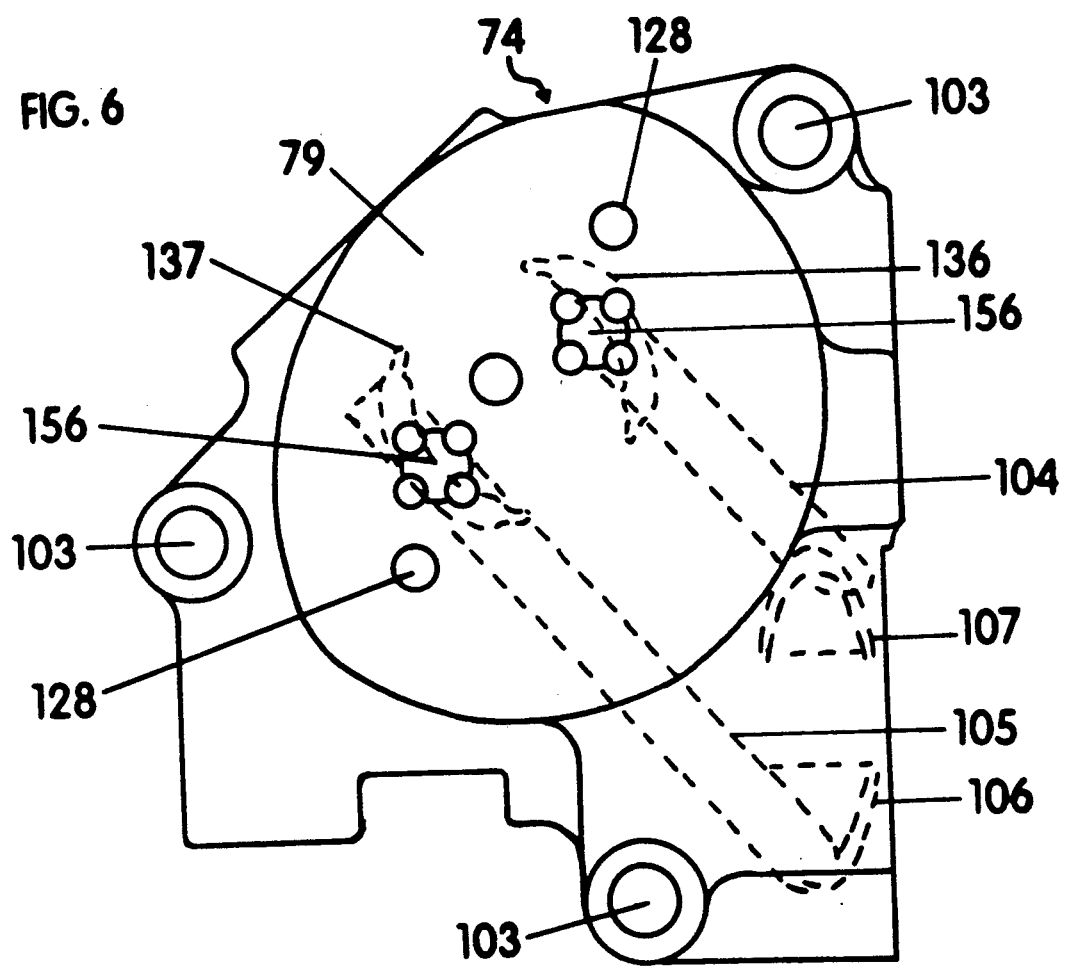
FIG. 6 is a bottom plan view of a center section of a hydrostatic transmission in accordance with this invention.

FIGS. 5 and 6 show center section 74 of the HST, which is securely mounted to upper housing 1 through bolt openings 103. Pump 14 is rotatably mounted on pump running surface 130 with center opening 138 corresponding to shaft opening 116 to receive input shaft 75.

Motor 27 is rotatably mounted on motor running surface 61 by conventional means and is supported by motor shaft 22. When the HST is not in operation, motor 27 is sealed to motor running surface 61 through the force of motor piston springs 25 against motor pistons 26, which press against thrust bearing 23 to create this seal. When the HST is in operation, there is an additional force resulting from the oil pressure. Specifically, the interior of motor piston chamber 147 is sufficiently large enough that the flow of oil through passage 102 creates a resultant net balance of oil pressure in cylinder block 27a in the direction towards motor running surface 61, creating a seal at this point. Pump 14 is retained on pump running surface 130 in a similar manner.

Motor shaft 22 is installed through and fully supported by openings 88 and 89 and running surface 140, all of which are integrally formed with center section 74. The means of supporting motor shaft 22 is a significant improvement over the prior art, which discloses the motor shaft supported at one end in the center section, and at the other end on some other external bearing housing. The present invention eliminates the need for such an additional bearing housing for motor shaft 22, reducing manufacturing expense and weight.

Proper alignment of motor shaft 22 is critical to the performance of the HST. The design of the present invention eliminates the necessity of aligning such an additional bearing support with the support on center section 74, resulting in an overall savings in weight and expense, as well as increasing the ease of manufacture of the transaxle.

Figure 9:
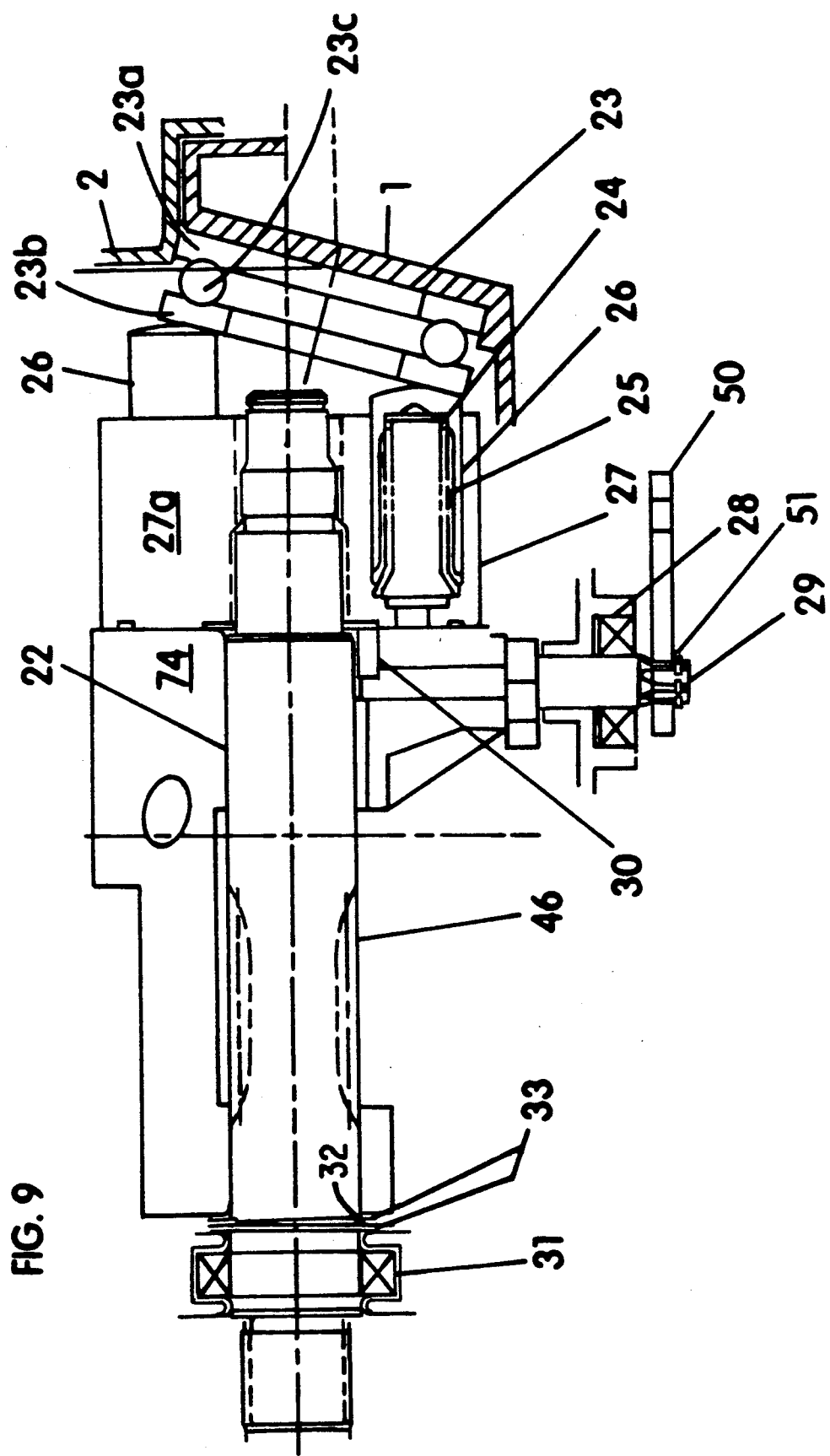
FIG. 9 is a detailed view of the motor and motor shaft of the hydrostatic transmission of the present invention.

As most clearly shown in FIGS. 2 and 9, motor 27 also contains a plurality of piston chambers 147, each of which contains a motor piston 26 and piston springs 25. Each motor piston chamber 147 has a passage 102 to receive oil flow from arcuate ports 106 and 107 on motor running surface 61 of center section 74.

Each motor piston 26 is driven by the oil flow received through arcuate ports 106 or 107 in a direction axial to motor 27 and against the generally circular motor thrust bearing 23. As shown in FIGS. 3 and 9, motor thrust bearing 23 is fixed in its position relative to motor pistons 26 at an angle such that the action of motor pistons 26 against thrust bearing 23 creates a rotational movement of cylinder block 27a of motor 27. Motor thrust bearing 23 is of standard construction and is composed of bearing plates 23a and 23b and bearing race 23c. Motor 27 is supported on and drives motor shaft 22. Cylinder block 27a of motor 27 has internal gear teeth (not shown) which mesh with gear teeth 45 on motor shaft 22 to rotate motor shaft 22 at a speed equal to the rotation of cylinder block 27a of motor 27.

A major improvement that this invention presents over the prior art is the elimination of the need for an intermediate support for motor thrust bearing 23. As shown in FIGS. 1, 2 and 9, motor shaft 22 does not extend through the center of thrust bearing 23. Therefore, thrust bearing 23 is fully supported at its proper angle by upper housing 1 without the need for an additional structural member such as is used for pump thrust bearing 9, which must be supported by swashplate 10. This results in a less expensive and simpler unit to manufacture, and the absence of the additional member reduces the overall size and weight of the transaxle unit.

As described below, oil flow from pump 14 to moor 27 is the means by which rotational power is transmitted by the HST. Arcuate ports 136 and 137 on pump running surface 130 provide the means for transferring oil from passage 101 of pump piston chamber 146 through oil passages 104 or 105 and to motor 27. Arcuate ports 106 and 107, which are located on motor running surface 61 and which coact with passages 102 of motor piston chamber 147, act to receive the oil from oil passages 104 or 105 and return it to pump 14.

It is to be understood that there are a plurality of pump pistons 13 and motor pistons 26 and their related parts and chambers, and, therefore, the discussion herein of these parts in a singular sense is for convenience only, and should not be read to limit the invention in any way. In the preferred embodiment, there are five (5) pump pistons and seven (7) motor pistons.

As shown in FIG. 3, each pump piston chamber 146 has a passage 101 opening for coaction with arcuate ports 136 and 137 on pump running surface 130 of center section 74. In the "forward" oil flow direction described above, the oil flow created by the movement of pump pistons 13 moves through passage 101 to arcuate port 137, and then through oil passage 105 to arcuate port 106 on motor running surface 61, and finally to passage 102 of motor piston chamber 147. The oil then returns to pump piston chambers 146 through passage 102, arcuate port 107, oil passage 104, arcuate port 136 and passage 101.

In the "reverse" oil flow direction described above, the oil essentially travels in a reverse direction, being forced by pump piston 13 through passage 101 and arcuate port 136 to oil passage 104 and arcuate port 17 and passage 102, and finally to motor piston chamber 147. The oil is then returned to pump 14 through arcuate port 106, oil passage 105 and arcuate port 137. The rotational direction of motor 27 depends upon whether this oil flow is in the "forward" or "reverse" direction, as this rotation, and ultimately the movement of the vehicle, will also be "forward" or "reverse."

As can be seen in FIG. 2, the transaxle design includes expansion chamber 121 formed by external wall 3 and internal wall 124. Such expansion chambers are well-known in the prior art and are used to provide a space for the oil to expand into during operation of the transaxle. Expansion chamber 121 may be located at different areas along the upper and lower housings 1 and 2, and, in the preferred embodiment, expansion chamber 121 is located along upper housing 1 or lower housing 2 outside differential gear 63.

As shown in FIGS. 1 and 2, braking for the transaxle is accomplished through a braking mechanism 109 located on, and supported by motor shaft 22 and comprising brake stator 57 and brake rotor 58, triggered by brake arm 53 and brake actuator 55. Braking mechanism 109 is located within a cavity 110 which is separated from transmission cavity 48 by a standard seal 31.

As is known in the prior art, the present invention uses a differential to transfer power from motor shaft 22 to the pair of oppositely-extending axle shafts 62 and 62' which are used to drive the vehicle. As shown in FIGS. 1-3, motor shaft 22 contains a center portion 46 which contains gear teeth 126 which mesh with teeth 63b on differential gear 63. Differential gear assemblies known in the art generally include an internal cross shaft that serves as the actual driving mechanism for the output axles. A key improvement in this invention is the use of a novel structure which eliminates the need for such an internal cross shaft on differential gear 63.

Figure 10:
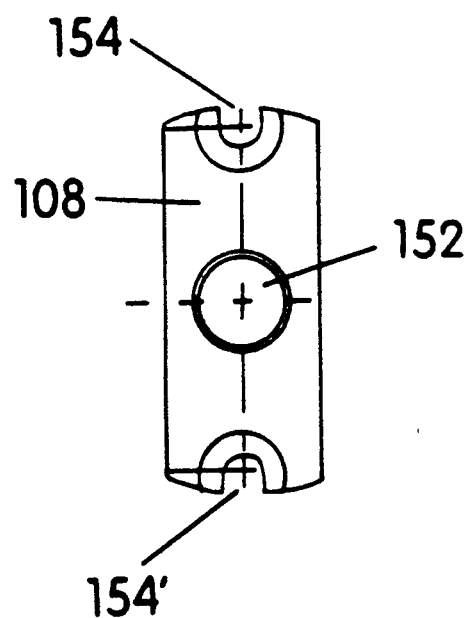
FIG. 10 is a top view of the endcap of the differential of the present invention.
Figure 11:
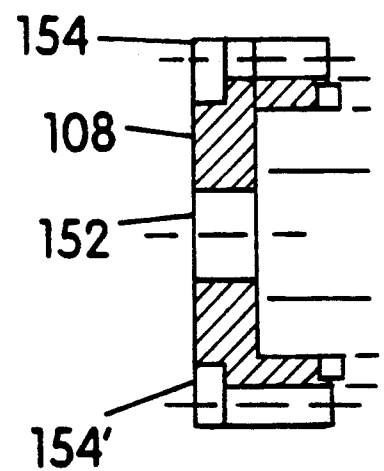
FIG. 11 is a side view of the endcap of FIG. 10.
Figure 12:
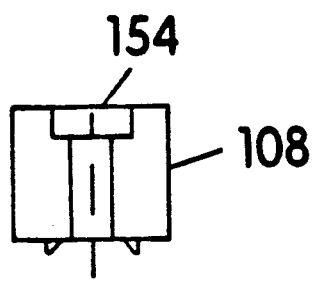
FIG. 12 is an end view of the endcap of FIG. 10.

As shown in FIG. 1, the various differential gears are contained in differential housing 64, which includes two identical opposing endcaps 108 and 108'. Endcaps 108 and 108' are shown in detail in FIGS. 10, 11 and 12. Axle shaft opening 152 is integrally formed therein to receive axle shaft 62 or 62'. Bolt openings 154 and 154' are also formed therein to receive and secure bolts 68 and 68'.

As is shown most clearly in FIG. 3, planet gear 66 is mounted onto the inside of differential gear 63 through opening 63c by means of a key or raised portion 66a which fits into keyway 63a formed in differential gear 63. Planet gear 66' is similarly located. Planet gears 66 and 66' are thus held in place by keyways 63a and 63a' and endcaps 108 and 108'. This arrangement replaces the cross-shaft of prior art designs, where the cross-shaft was used to support the planet gears. Planet gears 66 and 66' include a plurality of teeth 66b and 66b', which are meshed with and cause the rotation of bevel gears 65 and 65'. Bevel gears 65 and 65' are meshed with respective axle shaft gears 47 and 47' to cause rotation of axle shafts 62 and 62'.

Thus, each bevel gear 65 and 65' is located and held in place by planet gears 66 and 66' on one side and by endcap 108 or 108' on the other side. Endcaps 108 and 108' function to center and hold bevel gears 65 and 65' and to allow the entire differential assembly to be held together by two bolts and nut assemblies 68 and 68'. This is a much more compact and less complicated design than has been used in the prior art. In addition, the elimination of a cross shaft removes the need for a hollow center section, thereby making the differential design of the present invention stronger than prior art models.

Figure 7:
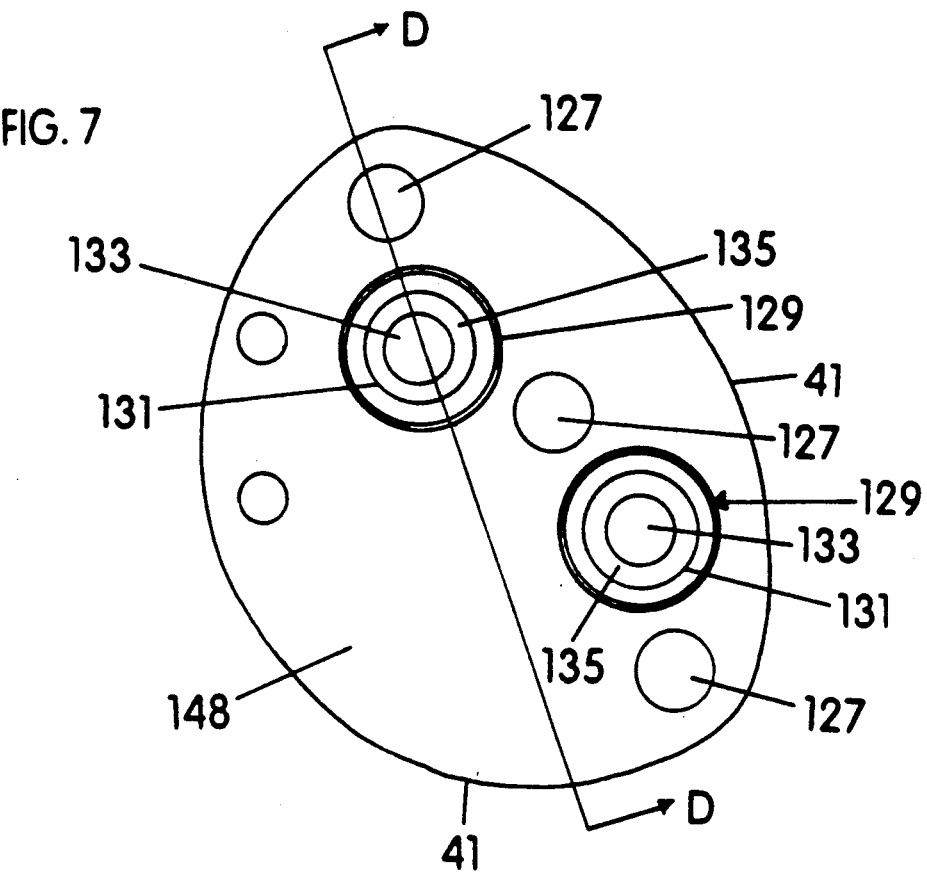
FIG. 7 is the top view of the check valve plate for the center section of a hydrostatic transmission.
Figure 8:
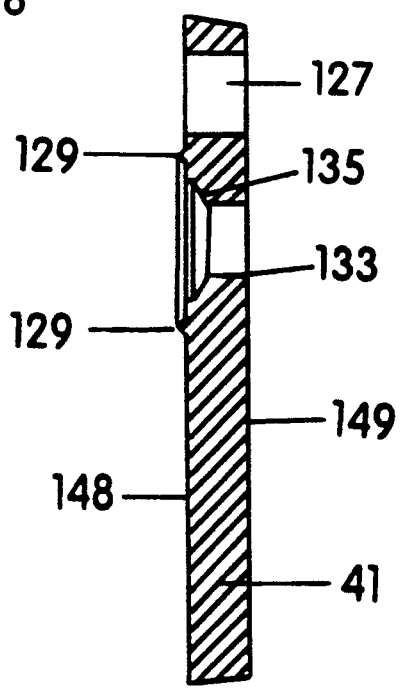
FIG. 8 is a fragmentary section view along the line D—D of FIG. 7.

As shown in FIGS. 3, 7 and 8, center section 74 contains a check valve mechanism including check valve plate 41, ball 39 and spring 40. Plate 41 is formed of powdered metal which is significantly harder than the cast aluminum used to form center section 74. Bottom face 79 of center section 74 is shown in FIG. 6. Plate 41 is mounted on bottom face 79 by three bolts 42 through bolt openings 127 and received by openings 128 on bottom face 79 of center section 74.

Plate 41 has top surface 148, which is flush with bottom face 79 of center section 74 when mounted, and bottom surface 149. As shown in FIG. 8, bottom plate surface 149 has generally circular opening 133 formed therein, while top plate surface 148 has a slightly larger opening 131 formed therein. Openings 133 and 131 coact with each other and with valve openings 156 on bottom face 79 to form check valve 139. Check valve 139 includes ball support surface 135 to support ball 39 when check valve 139 is in the closed position, as shown in FIG. 3. When the check valve 139 is opened, ball 39 lifts off of ball support surface 135 to allow oil from sump 155 to flow through check valve 139. Oil filters 43 are used to prevent contaminants from entering sump 155 from transmission cavity 48.

A raised annular surface or ring 129 is formed around opening 133 on top surface 148 of plate 41, and is pressed into the lower strength bottom face 79 of center section 74 to form a seal between plate 41 and center section 74. The minimal leakage which may occur due to deflection in the metal does not affect operation of the transaxle because center section 74 is within main transmission cavity 48, which is filled with oil. Thus, the present invention provides a simple, low cost sealing mechanism which allows for the use of a lighter cast aluminum center section without the need for the use of additional machining to use an O-ring, as is done in the prior art.

Prior art HST designs have the pump and motor mounted either at a 90-degree angle or in a parallel arrangement, whereby the pump and motor are set "back-to-back." In the present invention, the preferred embodiment calls for these elements to be positioned on center section 74 at the standard 90-degree angle to one another, as shown in the drawings However, if necessary, center section 74 could provide for motor running surface 61 to be inclined upwardly or downwardly in the vertical plane of FIG. 2. Such an orientation, which may be required by the configuration of the vehicle, would also require motor shaft 22 to remain parallel to motor 27. In this position, motor shaft 22 is no longer perpendicular to axle shafts 62 and 62' and differential gear 63, as is required to have gear teeth 63b and gear teeth 126 of motor shaft 22 to mesh using standard gearing.

To allow such an arrangement, the present invention would require the use of a helical gear at motor shaft center portion 46 or on differential gear 63 to allow these gears to properly mesh. Such helical gears are well-known in the art, but have not previously been used in HST designs to allow the pump and motor to be oriented at angles other than the standard 90-degrees. The angle of the helix on such a gear is determined by the angle between the motor shaft 22 and the axle shafts 62 and 62'.

With a transaxle, it is necessary to reduce the rotational speed of the input shaft as it is transmitted to the final drive axles. One of the disadvantages of prior art transaxle designs is the need to provide a reduction of angular shaft speed through mechanical gearing. Such mechanical reduction requires the use of extra gears, shafts, supports and various other related parts, as shown in prior art patents. This results in additional expense in manufacturing as well as additional weight in the transaxle. Furthermore, mechanical gears are subject to failure if stressed sufficiently or repeatedly.

In the present invention, at least a portion of this shaft speed reduction is accomplished through the hydraulics. In a preferred embodiment, this is accomplished by internally sizing motor 27 at a larger capacity than pump 14. As an example of the preferred embodiment, it has been discovered that if the capacity of motor 27 is 21 cubic centimeters (cc), while the capacity of pump 14 is 10 cc, a significant reduction in the speed of motor shaft 22 is achieved. With such sizing it has been found that the angular speed of motor shaft 22 is generally reduced to about one-half of the angular speed of input shaft 75.

In light duty applications where the prior art would require a double mechanical reduction, the present invention can eliminate this secondary mechanical reduction altogether. In heavy-duty applications which would require two or three mechanical reduction units, the present invention may only require a single secondary mechanical reduction unit. In either event, the present invention results in a significant savings in size, weight and expense over prior art designs. This also results in an improvement in reliability, as a hydraulic reduction is less susceptible to breakdown due to the fewer number of moving parts required. Furthermore, a hydraulic reduction is less likely to break from being overstressed than is a mechanical gear reduction.

As seen in FIG. 1, axle shafts 62 and 62' extend from differential housing 64 through transmission cavity 48 and axle cavity 49 to outer axle bearings 72. The wheels (not shown) of the vehicle are then attached at axle ends 150 and 150'. In prior art models, oil extends throughout axle cavity 49 along the length of the axle shafts to lubricate outer axle bearings 72 and is sealed in cavity 49 at seal 120.

However, inherent in the manufacture of any such axle shaft is a slight deviation from the main axis at either end 150 or 150' of axle shafts 62 and 62'. Such minor deviations occur through imperfections in the manufacturing process and do not affect performance of the axle shaft or the transaxle. Further deflection occurs due to axle loading at ends 150 and 150'. The sum of these deflections together with any wear at the outer axle bearings 72 can create minor gaps at seal 120, which can cause leakage of oil from axle cavity 49. Such a gap at seal 120, and subsequent oil leakage, can also occur through normal wear and tear. Wear of seal 120 and outer axle bearings 72 can cause detritus from the seal, bearing and surrounding structures to contaminate the oil.

In the prior art, oil leakage has been dealt with through the use of extra bolts and sealant at the location of seal 120 as well as at additional locations along sealing surface 125. This results in additional parts, expense and weight for the unit.

Since the present invention does not fill axle cavity 49 with oil, this problem is eliminated without the need for such extra bolts or sealant. As shown in FIG. 1, seals 71 are used to prevent oil from flowing from transmission cavity 48 to axle cavity 49. Seal 71 thus operates as the primary oil seal for transmission cavity 48 and, in a preferred embodiment, seal 71 is a seal made of nitryl.

In the present invention, a conventional higher viscosity grease within axle cavity 49 provides the necessary lubrication to outer axle bearings 72. Use of this higher viscosity grease provides better lubrication to the outer axle bearings 72 than is available through the use of oil. Seals 120 serve to maintain this higher viscosity grease within axle cavity 49 and thus do not serve as the primary oil seal. Moving the primary oil seal from outer axle bearing 72 to seal 71 eliminates or minimizes oil leaks, extends the life of the product and reduces the quantity of oil needed in the casing. Seal 120 further act to minimize the amount of outside contaminants which reach outer axle bearings 72.

Another important and novel feature of this invention is the hydraulic bypass shown in FIGS. 2 and 9. The effect of this bypass system is to enable the vehicle user to roll or "freewheel" the vehicle without resistance from the oil in the HST. When an HST does not have any power being applied to it through the tractor motor, pump 14 and motor 27 are not being rotated. Therefore, any attempt to roll the vehicle would transmit the rotational energy through axle shafts 62 and 62′, and through differential gear 63 to motor shaft 22. This in turn will rotate motor 27, and the action of motor pistons 26 against motor thrust bearing 23 causes axial motion of motor pistons 26, causing oil flow through the porting of center section 74. However, with pump 14 at neutral there is no place for the oil to go, and high pressure results. This high pressure causes resistance to further motion of motor shaft 22 and axles 62 and 62′ and prevents the user from pushing the tractor.

Prior art solutions to this problem generally involve placing a valve between arcuate ports 106 and 107 to allow the oil to flow between these two ports, i.e., between the pressure side and vacuum side of HST center section 74. However, such a hydraulic valve allows only a limited amount of oil to pass between the ports due to inherent design limitations, such as the diameter of the hydraulic valve through which the oil is diverted. Such a valve also requires accurate machining to maintain minimum clearances to reduce leakage during normal operation of the unit.

The present invention solves this problem by use of a mechanism to lift motor 27 off of motor running surface 61 of center section 74, thus breaking the seal at that point and allowing oil to flow out of arcuate oil port 106 and into transmission cavity 48. Thus, the oil is not ported from the pressure side to the vacuum side, but rather bypasses this entire circuit within center section 74.

To activate this feature, bypass arm 50 is manipulated by the user to rotate bypass actuator 29. Seal 28 is used to retain oil within the main transmission cavity 48 at this point. Bypass actuator 29 includes rod 115, which is shaped at its base so that rotation of rod 115 forces bypass plate 30 to press against the base of motor 27, breaking its seal to motor running surface 61. This allows the oil to flow from arcuate port 106 to transmission cavity 48. The oil is then returned to motor 27 through arcuate port 107. This design enables the vehicle to readily "free wheel" with less resistance from the oil.

Further manipulation of bypass arm 50 and rod 115 causes bypass plate 30 to withdraw off of motor 27, allowing motor 27 to return to its normal position on motor running surface 61, reestablishing the seal at that point. The design of the present invention could also be used in a different embodiment to lift pump 14 off of pump running surface 130, as this would have the same effect.

An advantage of this design i that it is very simple and inexpensive to manufacture and install because hydraulic bypasses using valves to move the oil between its porting sections require very precise machining of the valves to prevent unwanted leakage, and are therefore more expensive to manufacture. In addition, this mechanism dissipates the oil into the cavity rapidly to allow immediate movement of the vehicle.

The above descriptions are intended to illustrate the various features of this invention and are not intended to limit it in any way. Further advantages will be obvious to one of ordinary skill in the art. This invention should be read as limited only by the following claims.

We claim:

1. A transaxle including a hydrostatic transmission for use in a vehicle to convert rotational power from the vehicle engine to output axle means, comprising
   (a) a housing for said transaxle providing a sump cavity and separate axle cavities;
   (b) a hydrostatic transmission including:
      (1) a first hydraulic displacement unit mounted in said sump cavity and having a rotatable cylinder block containing a plurality of chambers for holding reciprocal pistons and receiving a displacement unit mounted in said sump cavity and having a rotatable cylinder block containing a plurality of chambers for holding reciprocal pistons and engaging one end of a rotatable drive shaft to drive said rotatable drive shaft, said rotatable drive shaft supported and arranged within said housing so as not to extend through said thrust bearing;
      (2) a center section mounted in said sump cavity and having means for rotatably mounting said first hydraulic displacement unit and said second hydraulic displacement unit, said means including means for hydraulically connecting said first and second hydraulic displacement units, a first running surface positioned to rotatably mount said first hydraulic displacement unit, a second running surface positioned to rotatably mount said second hydraulic displacement unit and a bottom face, porting means for hydraulically connecting said first displacement unit to said second hydraulic displacement unit integrally formed therein, and bearing means integrally formed in said center section for receiving and fully supporting said rotatable drive shaft;

(3) a thrust bearing mounted in and fully supported by said housing so as to engage said reciprocal pistons of said second hydraulic displacement unit;

(4) means for reducing the speed of said rotatable input shaft, wherein at least a portion of said speed reduction is accomplished through said porting means and said piston chambers of said first and said second hydraulic displacement units;

(5) a check valve mechanism comprising valve openings formed into the bottom face of said center section and extending to s id porting means, a plate mounted on said bottom face of said center section and plurality of plate openings formed therein and corresponding to said valve openings, a raised annular surface formed on the top surface of said plate around each said plate opening, said raised annular surface acting to form a seal between said plate and said bottom face of said center section, a plurality of balls, one of said balls being mounted in each of said valve openings and said plate openings, and means for releasably securing said balls against said plate openings;

(c) a differential gear mechanism connected to said rotatable drive shift comprising a ring gear engaged to and driven by said input drive means, a plurality of planet gears securely connected to said ring gear in a manner to allow rotation of said planet gears around an axis perpendicular to the axis of rotation of said ring gear, a plurality of bevel gears engaged and driven by said planet gears, said bevel gears being mounted on and driving said output axle means; and clamping means for securing said bevel gears such that said bevel gears are solely supported by said planet gear unit and said clamping means, said output axle means being connected to and driven by said (d) means for diverting said hydraulic fluid out of said porting means and said first displacement means and said second displacement means to enable said vehicle to be moved with minimal resistance from said hydraulic fluid; and (e) said sump cavity containing said hydraulic fluid for said hydrostatic transmission and said output drive means, and said axle cavities formed within said housing separate from said sump cavity for enclosing said output axle means and a lubricating fluid for said drive axles.

2. A transaxle as set forth in claim 1, wherein said means for rotatably mounting said first and second hydraulic displacement units allows such first and second hydraulic displacement units to be mounted at an angle other than perpendicular to one another, and said means for connecting said differential gear mechanism to said rotatable drive shaft includes a helical gear, with the angle of the helix of said helical gear being equal to the angle between said drive shaft and said output axle 3. In a transaxle including a hydrostatic transmission for use in a vehicle to convert rotational power from the vehicle engine to output axle means, the improvement comprising (a) housing for said transaxle providing a fluid sump;

(b) a first hydraulic displacement unit mounted in said housing and having a rotatable cylinder block containing a plurality of chambers for holding reciprocal pistons, and receiving a rotatable input shaft;

(c) a second hydraulic displacement unit mounted in said housing and having a rotatable cylinder block containing a plurality of chambers for holding reciprocal pistons, and engaging one end of a rotatable drive shaft to drive said rotatable drive shaft;

(d) a center section mounted in said housing and having
(1) a first running surface positioned to rotatably mount said first hydraulic displacement unit;
(2) a second running surface positioned to rotatably mount said second hydraulic displacement unit;
(3) porting means for hydraulically connecting said first displacement unit to said second hydraulic displacement unit integrally formed therein; and
(4) bearing means integrally formed in said center section for receiving and fully supporting said rotatable drive shaft;

(e) a differential gear mechanism mechanically connected to said rotatable drive shaft; and (f) a pair of oppositely extending axles connected to and driven by said differential gear mechanism to drive said vehicle.

4. A transaxle including a hydrostatic transmission for use in a vehicle to convert rotational power from the vehicle engine to output axle means, comprising (a) a housing for said transaxle providing a fluid sump;

(b) a first hydraulic displacement unit mounted in said housing and having a rotatable cylinder block containing a plurality of chambers for holding reciprocal pistons, and receiving a rotatable input shaft;

(c) a second hydraulic displacement unit mounted in said housing and having a rotatable cylinder block containing a plurality of chambers for holding reciprocal pistons, and engaging and driving a rotatable drive shaft;

(d) means for rotatably mounting and hydraulically connecting said first hydraulic displacement unit and said second hydraulic displacement unit, said means including bearing means integrally formed therewith for receiving and supporting said rotatable drive shaft;

(e) said rotatable drive shaft being fully supported by said bearing means; and (f) means for connecting said rotatable drive shaft to said output axle means to drive said vehicle.

5. A transaxle as set forth in claim 4, including a thrust bearing mounted in and fully supported by said housing so as to engage said reciprocal pistons of said second hydraulic displacement unit, while not engaging or supporting said drive shaft.

6. A hydrostatic transmission as set forth in claim 4, wherein said first and second running surfaces of said center section are formed at an angle other than perpendicular with respect to one another, and said rotatable drive shaft is mechanically connected to said differential gear mechanism through a helical gear, wherein the angle of the helix of said helical gear is equal to the angle between said drive shaft and said output axle means.

7. A transaxle with a hydrostatic transmission for use in a vehicle to convert rotational power from the vehicle engine to output axle means, comprising (a) a housing for said transaxle providing a fluid sump;

(b) a first hydraulic displacement unit located in said housing and having a rotatable cylinder block containing a plurality of chambers for holding reciprocal pistons, and receiving a rotatable input shaft;

(c) a second hydraulic displacement unit located in said housing and having a rotatable cylinder block containing a plurality of chambers for holding reciprocal pistons, and engaging and driving a rotatable drive shaft;

(d) a center section mounted in said housing and having a first running surface positioned to rotatably mount said first hydraulic, displacement unit, a second running surface positioned to rotatably mount said second hydraulic displacement unit, and porting means for hydraulically connecting said first displacement unit to said second hydraulic displacement unit integrally formed therein;

(e) a thrust bearing mounted in and fully supported by said housing so as to engage said reciprocal pistons of said second hydraulic displacement unit;

(f) said rotatable drive shaft supported and arranged within said housing so as not to extend through said thrust bearing; and (g) a pair of oppositely extending axles connected to and driven by a differential gear mechanism to drive said vehicle.

8. A transaxle with hydrostatic transmission for use in a vehicle to convert rotational power from the vehicle engine to output axle means, comprising (a) a housing for said transaxle providing a fluid sump;

(b) a first hydraulic displacement unit located in said housing and having a rotatable cylinder block containing a plurality of chambers for holding reciprocal pistons, and receiving a rotatable input shaft;

(c) a second hydraulic displacement unit located in said housing and having a rotatable cylinder block containing a plurality of chambers for holding reciprocal pistons, and engaging and driving a rotatable drive shaft;

(d) means for rotatably mounting and hydraulically connecting said first hydraulic displacement unit and said second hydraulic displacement unit, said means including bearing means integrally formed therewith for receiving and supporting said rotatable drive shaft;

(e) a thrust bearing mounted in and fully supported by said housing so as to engage said reciprocal pistons of said second hydraulic displacement unit;

(f) said rotatable drive shaft being supported and arranged within said housing so as not to extend through said thrust bearing;

(g) means for connecting said rotatable drive shaft to said output axle means to drive said vehicle.

9. A hydrostatic transmission for use in a vehicle to convert rotational power from the vehicle engine to a pair of oppositely extending differentially powered axles, comprising (a) a housing for said transaxle providing a fluid sump;

(b) a first hydraulic displacement unit located in said housing and having a rotatable cylinder block containing a plurality of chambers for holding reciprocal pistons, and receiving a rotatable input shaft;

(c) a second hydraulic displacement unit located in said housing and having a rotatable cylinder block containing a plurality of chambers for holding reciprocal pistons, and engaging and driving a rotatable drive shaft;

(d) a center section mounted in said housing and having a first running surface positioned to rotatably mount said first hydraulic displacement unit, a second running surface positioned to rotatably mount said second hydraulic displacement unit, and porting means for hydraulically connecting said first displacement unit to said second hydraulic displacement unit integrally formed therein;

(e) a differential gear mechanism mechanically connected to said drive shaft;

(f) a pair of oppositely extending axles connected to said differential gear mechanism to drive said vehicle; and (g) means for reducing the speed of said input shaft, wherein at least a portion of said reduction is accomplished through said porting means and said piston chambers of said first and second hydraulic displacement units.

10. A hydrostatic transmission for use in a vehicle to convert rotational power from the vehicle engine to output axle means of said vehicle, comprising (a) at least one hydraulic displacement pump located in said housing and having a rotatable cylinder block containing a plurality of chambers for holding reciprocal pistons, and receiving a rotatable input shaft;

(b) at least one hydraulic displacement motor located in said housing and having a rotatable cylinder block containing a plurality of chambers for holding reciprocal pistons, and engaging and driving a rotatable drive shaft;

(c) mounting means for rotatably mounting said hydraulic displacement pump and said hydraulic displacement motor;

(d) porting means integrally formed with said mounting means for hydraulically connecting said hydraulic displacement pump to said hydraulic displacement motor;

(e) hydraulic transfer means including said piston chambers of said hydraulic displacement pump, said piston chambers of said hydraulic displacement motor and said porting means; and (f) means for reducing the speed of said input shaft, wherein at least a portion of the speed reduction of said input shaft is accomplished through said hydraulic transfer means.

11. A hydrostatic transmission as set forth in claim 10, wherein said mounting means comprises a center section mounted in said housing and having a first running surface positioned to rotatably mount said hydraulic displacement pump and a second running surface positioned to rotatably mount said hydraulic displacement motor.

12. A hydrostatic transmission as set forth in claim 10, wherein said means for reducing said speed includes said hydraulic displacement pump having an internal displacement which is smaller than the internal displacement of said hydraulic displacement motor.

13. A hydrostatic transmission in accordance with claim 12 wherein said speed reduction is proportional to a fraction wherein the numerator is equal to said internal displacement of said hydraulic displacement pump and the denominator is equal to said internal displacement of said hydraulic displacement motor.

14. A hydrostatic transmission is accordance with claim 13 wherein said numerator is 10 and said denominator is 21.

15. A transaxle with hydrostatic transmission for use in a vehicle to convert rotational power from the vehicle engine to output axle means, comprising
(a) a housing for said transaxle providing a fluid sump;
(b) a first hydraulic displacement unit located in said housing and having a rotatable cylinder block containing a plurality of chambers for holding reciprocal pistons, and receiving a rotatable input shaft;
(c) a second hydraulic displacement unit located in said housing and having a rotatable cylinder block containing a plurality of chambers for holding reciprocal pistons, and engaging and driving a rotatable drive shaft;
(d) a center section mounted in said housing and having
  (1) a first running surface positioned to rotatably mount said first hydraulic displacement unit and a second running surface positioned to rotatably mount said second hydraulic displacement unit, wherein said first and second running surfaces are formed at an angle other than perpendicular with respect to one another;
  (2) porting means for hydraulically connecting said first hydraulic displacement unit to said second hydraulic displacement unit being integrally formed with said center section;
(e) means for connecting a differential gear mechanism to said rotatable drive shaft;
(f) a pair of oppositely extending axles connected to and driven by said differential gear mechanism to drive said vehicle; and
(g) means for connecting said differential gear mechanism and said pair of oppositely extending axles including a helical gear, wherein the angle of the helix of said helical gear is equal to the angle between said rotatable drive shaft and said pair of axles.

16. A hydrostatic transmission for use in a vehicle to convert rotational power from the vehicle engine to output axle means, comprising
(a) a housing providing a fluid sump;
(b) a first hydraulic displacement unit having a rotatable cylinder block containing a plurality of chambers for holding reciprocal pistons, and receiving a rotatable input shaft;
(c) a second hydraulic displacement unit having a rotatable cylinder block containing a plurality of chambers for holding reciprocal pistons, and engaging and driving a rotatable drive shaft;
(d) means for rotatably mounting said first hydraulic displacement unit and said second hydraulic displacement unit at an angle other than perpendicular to one another, said means including means for hydraulically connecting said first and said second hydraulic displacement units;
(e) means for connecting said rotatable drive shaft to said output axle means to drive said vehicle; and
(f) said means for connecting said rotatable drive shaft to said output axle means including a helical gear, with the angle of the helix of said helical gear being equal to the angle between said drive shaft and said output axles.

17. A hydrostatic transmission for use in a vehicle to transfer rotational power from the vehicle engine to a pair of oppositely extending differentially powered axles, comprising
(a) a housing for said transaxle providing a sump for hydraulic fluid;
(b) a first hydraulic displacement unit located within said housing and having a rotatable cylinder block containing a plurality of chambers for holding reciprocal pistons, and receiving a rotatable input shaft;
(c) a second hydraulic displacement unit located within said housing and having a rotatable cylinder block containing a plurality of chambers for holding reciprocal pistons, and engaging and driving a rotatable drive shaft;
(d) a center section mounted in said housing and having
  (1) a first running surface positioned to rotatably mount said first hydraulic displacement unit;
  (2) a second running surface positioned to rotatably mount said second hydraulic displacement unit;
  (3) porting means for hydraulically connecting said first displacement unit to said second hydraulic displacement unit integrally formed within said center section;
(e) means for diverting said hydraulic fluid from said porting means to said sump to enable said vehicle to be moved with minimal resistance from said hydraulic fluid; and
(f) means for connecting said rotatable drive shaft to said output axle means to drive said vehicle.

18. A hydrostatic transmission as set forth in claim 17, wherein said means for diverting said fluid comprises means for lifting said first hydraulic displacement unit off said first running surface to allow said fluid to drain quickly from said porting means to said sump.

19. A hydrostatic transmission as set forth in claim 17, wherein the means for diverting said fluid comprises means for lifting said second hydraulic displacement unit off of said second running surface to allow said fluid to drain quickly from said porting means to said sump.

20. A hydrostatic transmission for use in a vehicle to convert rotational power from the vehicle engine to output axle means, comprising
(a) a housing providing a sump for hydraulic fluid;
(b) a first hydraulic displacement unit located within said housing and having a rotatable cylinder block containing a plurality of chambers for holding reciprocal pistons, and receiving a rotatable input shaft;
(c) a second hydraulic displacement unit located within said housing and having a rotatable cylinder block containing a plurality of chambers for holding reciprocal pistons, and engaging and driving a rotatable drive shaft;
(d) mounting and connection means for rotatably mounting and hydraulically connecting said first hydraulic displacement unit and said second hydraulic displacement unit;
(e) hydraulic transfer means for containing hydraulic fluid separate from said sump and comprising said piston receiving chambers of said first hydraulic displacement unit, said piston receiving chambers of said second hydraulic displacement unit and said mounting and connection means;
(f) means for mechanically diverting said hydraulic fluid from said hydraulic transfer means to said sump to enable said vehicle to be moved with minimal resistance from said hydraulic fluid.

21. A transaxle including a hydrostatic transmission for transmitting rotational power from an engine to a pair of oppositely extending drive axles, comprising
(a) a housing for enclosing said transaxle providing a sump for hydraulic fluid;
(b) a hydrostatic transmission located within said housing and including at least one hydraulic pump and at least one hydraulic motor;
(c) output drive means for transmitting power from said hydrostatic transmission to said drive axles;
(d) said sump containing said hydraulic fluid, said hydrostatic transmission and said output drive means; and
(e) a plurality of cavities formed within said housing and separate from said sump for enclosing said drive axles and a lubricating fluid for said drive axles.

22. A transaxle including a hydrostatic transmission for use in a vehicle to convert rotational power from the vehicle engine to output axle means, comprising
(a) a housing for said transaxle providing a fluid sump;
(b) a first hydraulic displacement unit located within said housing and having a rotatable cylinder block containing a plurality of chambers for holding reciprocal pistons, and receiving a rotatable input shaft;
(c) a second hydraulic displacement unit located within said housing and having a rotatable cylinder block containing a plurality of chambers for holding reciprocal pistons, and engaging and driving a rotatable drive shaft;
(d) a center section mounted in said housing and having
 (1) a first running surface positioned to rotatably mount said first hydraulic displacement unit, a second running surface positioned to rotatably mount said second hydraulic displacement unit and a bottom surface;
 (2) porting means integrally formed therein for hydraulically connecting said first displacement unit to said second hydraulic displacement unit;
(e) a check valve mechanism comprising
 (1) valve openings formed into the bottom face of said center section and extending to said porting means;
 (2) a plate mounted on said bottom face of said center section and having a top surface and a bottom surface, a plurality of plate openings formed therein corresponding to said valve openings, and a raised ridge means formed on the top surface of said plate around each said plate opening, said raised ridge means acting to form a seal between said plate and said bottom face of said center section;
 (3) a plurality of balls, one of said balls being mounted in each of said valve openings and said plate openings, and means for releasably securing said balls against said plate openings; and
(f) means for connecting said rotatable drive shaft to said output axle means to drive said vehicle.

23. A hydrostatic transmission as in claim 22, wherein said plate is composed of powdered metal and said center section is composed of aluminum.

24. A differential gear unit having input drive means to power said differential gear unit and output axle means powered by said differential gear unit, comprising
(a) a ring gear engaged to and driven by said input drive means;
(b) plurality of planet gears securely connected to said ring gear in a manner to allow rotation of said planet gears around an axis perpendicular to the axis of rotation of said ring gear;
(c) a plurality of bevel gears engaged and driven by said planet gears, said bevel gears being mounted on and driving said output axle means;
(d) clamping means for securing said bevel gears such that said bevel gears are solely supported by said planet gears and said clamping means.

25. A hydrostatic transmission for use in a vehicle to convert rotational power from the vehicle engine to output axle means, comprising
(a) a housing providing a fluid sump;
(b) a first hydraulic displacement unit located within said housing and having a rotatable cylinder block containing a plurality of chambers for holding reciprocal pistons, and receiving a rotatable input shaft;
(c) a second hydraulic displacement unit located within said housing and having a rotatable cylinder block containing a plurality of chambers for holding reciprocal pistons, and engaging and driving a rotatable drive shaft;
(d) means for rotatably mounting and hydraulically connecting said first hydraulic displacement unit and said second hydraulic displacement unit, said means including bearing means integrally formed therewith to receive and support said rotatable drive shaft;
(e) a differential gear mechanism mechanically connected to said rotatable drive shaft, said differential gear mechanism comprising a ring gear engaged to and driven by said input drive means, a plurality of planet gears securely connected to the inside surface of said ring gear to allow gears to rotate with said ring gear around the axis of rotation of said ring gear to allow each said planet gear to rotate independently of said ring in an axis of rotation perpendicular to the axis of rotation of said planet gear, a plurality of bevel gears engaged and driven by said planet gear, said bevel gears being mounted on and driving said output axle means, and clamping means for securing said bevel gear unit such that said bevel gears are solely supported by said planet gear unit and said clamping means.

26. A hydrostatic transmission in accordance with claim 25, wherein said output axle means includes a differential gear mechanism mechanically connected to said drive shaft and a pair of oppositely extending axles connected to and driven by said differential gear mechanism to drive said vehicle.

* * * * *

UNITED STATES PATENT AND TRADEMARK OFFICE
CERTIFICATE OF CORRECTION

PATENT NO. : 5,201,692
DATED : April 13, 1993
INVENTOR(S) : Johnson and Hauser It is certified that error appears in the above-identified patent and that said Letters Patent is hereby corrected as shown below:

Column 12, line 21, "i" should read --is--.

Column 12, line 22, insert --it does not require precise tolerances. Prior art-- after "because".

Column 12, line 44 insert --rotatable input shaft, a second hydraulic-- after "receiving a".

Column 13, line 13, "s id" should read --said--.

Column 13, line 15 insert --having a top surface and a bottom surface, a-- after "said center section and".

Column 13, line 39 insert --differential gear mechanism to drive said vehicle;-- after "driven by said".

Column 13, line 59 insert --means.-- after "axle".

Signed and Sealed this

Eighteenth Day of January, 1994

Attest:

BRUCE LEHMAN

*Attesting Officer*    *Commissioner of Patents and Trademarks*